US009227821B1

(12) United States Patent
Delplace

(10) Patent No.: US 9,227,821 B1
(45) Date of Patent: Jan. 5, 2016

(54) CRANE OPERATION SIMULATION

(71) Applicant: Trimble Navigation Limited, Sunnyvale, CA (US)

(72) Inventor: Jean-Charles Delplace, Longueil Sainte Marie (FR)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 14/448,333

(22) Filed: Jul. 31, 2014

(51) Int. Cl.
*G06F 19/00* (2011.01)
*B66C 13/48* (2006.01)
*G06F 17/50* (2006.01)

(52) U.S. Cl.
CPC ............ *B66C 13/48* (2013.01); *G06F 17/5009* (2013.01)

(58) Field of Classification Search
CPC . B66C 13/06; G06F 17/5018; G06F 2217/16; G06T 13/00; G06T 13/40; G06T 13/60; G06T 17/20; G06T 2210/56
USPC ........... 701/50; 56/72; 212/295; 182/2.1–2.4, 182/2.7–2.11
See application file for complete search history.

(56) References Cited

U.S. PATENT DOCUMENTS 8,502,818 B1 * 8/2013 Mueller-Fischer ..... G06T 17/20 345/420
2014/0202970 A1 * 7/2014 Kang ...................... B66C 13/06 212/275

FOREIGN PATENT DOCUMENTS

KR 2013-0121323 * 11/2013

* cited by examiner

*Primary Examiner* — Muhammad Shafi

(57) ABSTRACT

A method for method for simulating a lift plan including: accessing a set of crane capability parameters for a crane at a worksite; accessing data relating to a set of factors, if any, occurring external to the crane, wherein the set of factors affects an operation of the crane at the worksite; based on the set of crane capability parameters, the data relating to the set of factors, if any, occurring external to the crane and affecting the operation of the crane and a movement plan for moving a set of objects at the worksite, generating a lift plan for the set of objects at the worksite; and generating a 3-D simulation of the lift plan.

19 Claims, 7 Drawing Sheets

500

CRANE OPERATION SIMULATION

BACKGROUND

Lifting devices, such as cranes, are employed to hoist or lift objects to great heights. The crane may be employed at a location such as a construction site. The construction site may have many different objects and types of objects or assets associated with the construction type such as equipment, beams, lumber, building material, etc. The objects may or may not be moved by the crane. The crane may swivel or pivot about a pivot point to allow the crane to lift and move objects into position. Constructing a building or other structure requires much planning, including the planning of lift schedules for the cranes. There are many difficulties associated with the planning of a lift schedule, such as the following: foreseeing obstacles a crane may encounter for given lifts; placing the cranes at the worksite in critical positions to best perform a lifting tasks; visualizing all aspects at the worksite before equipment, such as cranes, are placed at the worksite; foreseeing how a building will look when it is partially constructed and thus foreseeing crane operation issues regarding the partially constructed building; and foreseeing how long construction will last.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to this description should be understood as not being drawn to scale.

DESCRIPTION OF EMBODIMENT(S)

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as “accessing”, “generating”, “determining”, “adjusting”, or the like, often refer to the actions and processes of a computer system, or similar electronic computing device. The computer system or similar electronic computing device manipulates and transforms data represented as physical (electronic) quantities within the computer system’s registers and memories into other data similarly represented as physical quantities within the computer system memories or registers or other such information storage, transmission, or display devices. Embodiments of the present technology are also well suited to the use of other computer systems such as, for example, mobile communication devices.

The discussion below begins with a general overview of embodiments. The discussion follows with a description of a tower crane system and a luffer crane (See FIGS. 1A and 1B) and an environment inclusive of a crane (See FIG. 2), in accordance with an embodiment. Following, a lift plan simulator for providing a 3-D simulation of a lift plan for an operation of a crane at a worksite (See FIGS. 3 and 4) is described, in accordance with embodiments. A flowchart of a method for simulating a lift plan (See FIG. 5) is shown, in accordance with embodiments. Then, an example computer system upon which embodiments of the present technology may be implemented (See FIG. 6) is described.

General Overview of Embodiments

Figure 1A:
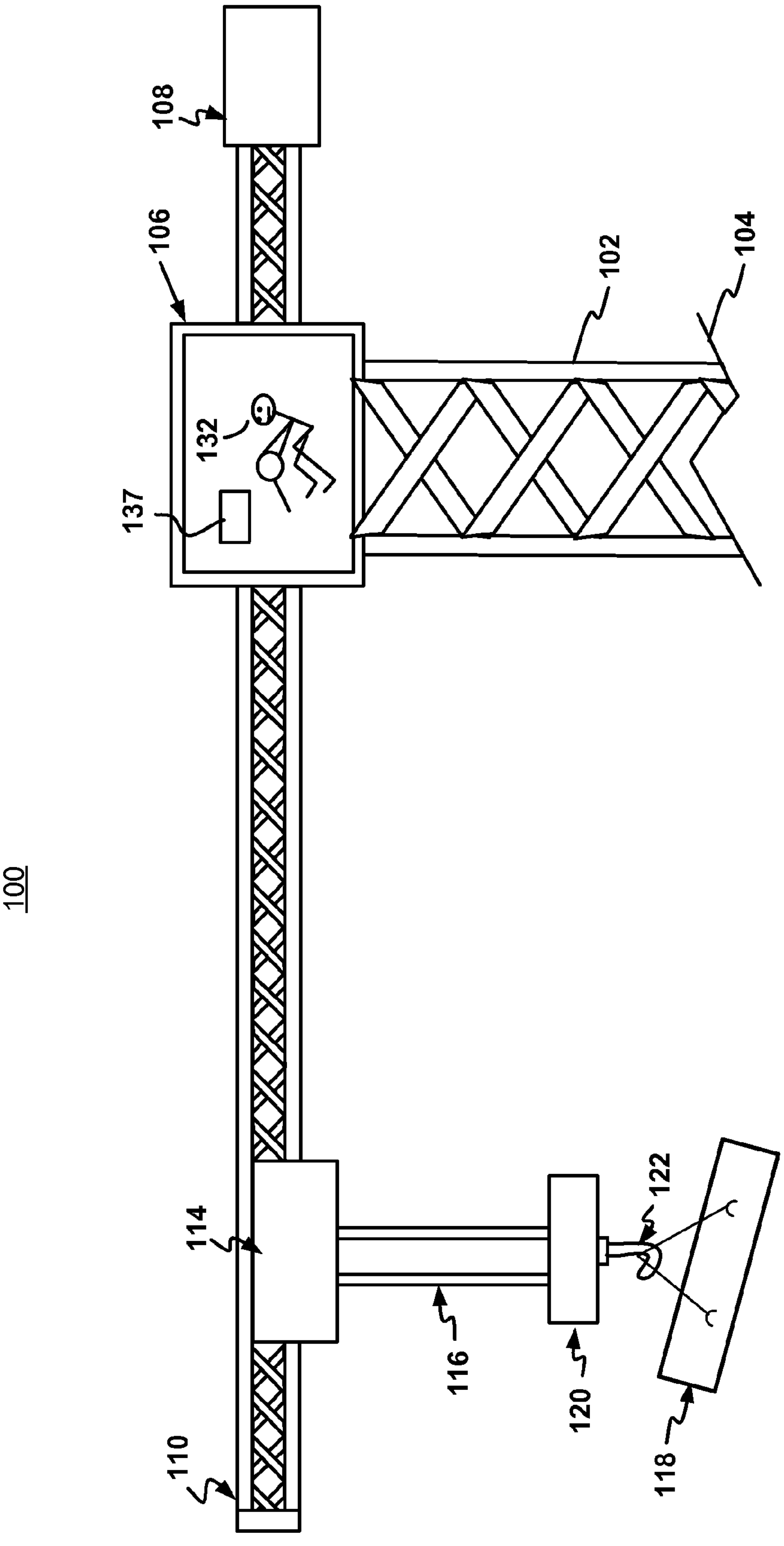
FIGS. 1A and 1B are block diagrams of a tower crane system and a luffer crane, respectively, in accordance with embodiments of the present technology.
Figure 1B:
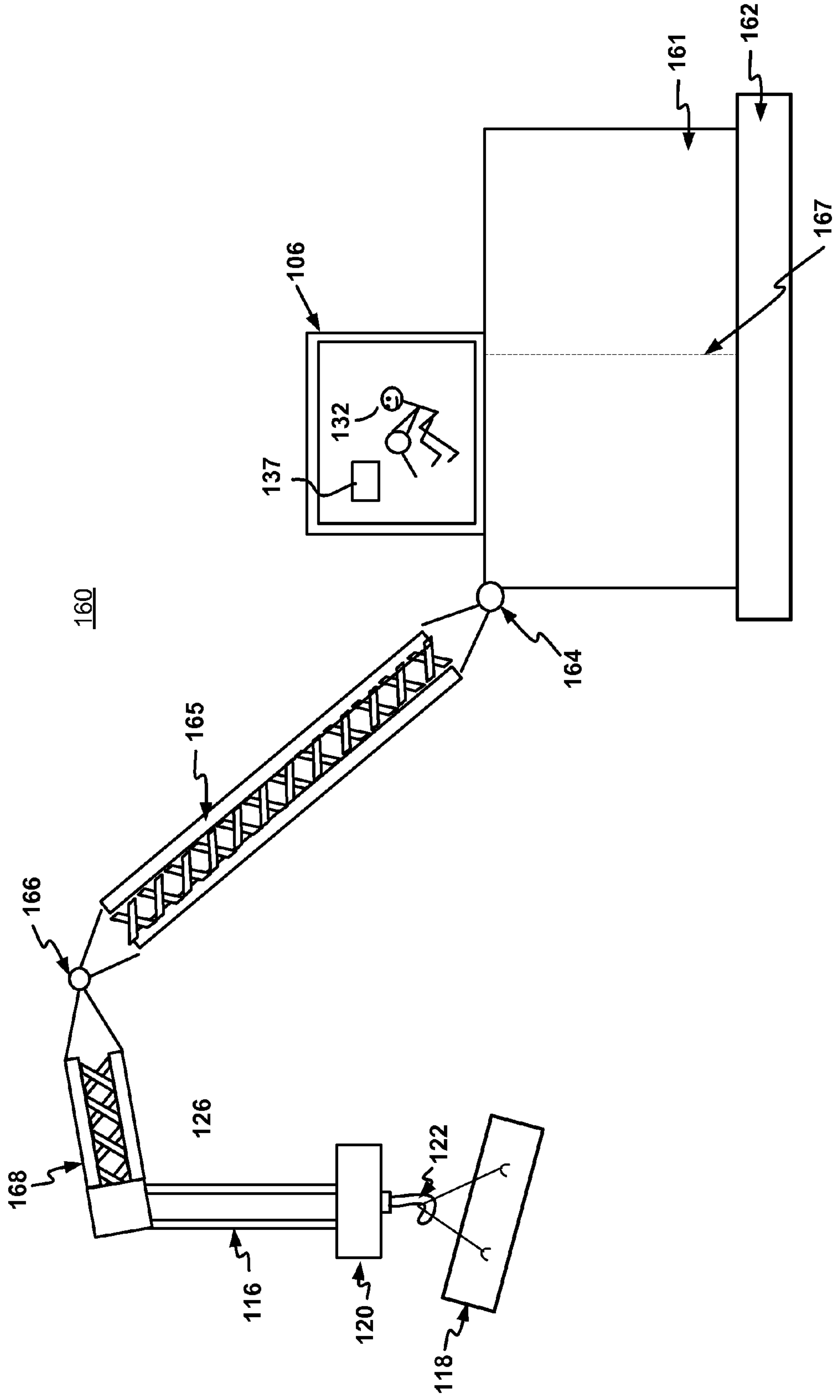

Cranes are large, tall machines used for moving heavy objects, typically by suspending them from a projecting arm or beam. Non-limiting examples of cranes are the tower crane and the luffer crane, as is shown in FIGS. 1A and 1B, as well as described herein. These cranes are used for, among other things, constructing buildings or other structures. Constructing a building or other structure requires much planning, including the planning of lift schedules for the cranes. There are many difficulties associated with the planning of a crane’s lift schedule, such as the following: foreseeing obstacles crane(s) may encounter for given lifts; placing cranes at a worksite in critical positions to best perform a lift schedule; visualizing all aspects at the worksite before items, such as cranes and/or other equipment is placed at the worksite; foreseeing how a building will look when it is partially constructed and thus foreseeing crane operation issues regarding the partially constructed building; and foreseeing how long construction will last.

Embodiments described herein provide a method and system for providing a 3-D simulation of a lift plan for a set of cranes at a worksite. It should be appreciated that the set of cranes may be one or more cranes. The 3-D simulation of the lift plan is created before the set of cranes is placed at the worksite, thus enabling managers and lift plan designers a visualization of proposed crane operations so that better planning decisions may be made. A worksite is the area in which the crane may be operated. A lift plan describes a procedure for moving the set of objects at the worksite.

In one embodiment, the simulation measurements associated with productivity indicators of the 3-D simulation are examined. Productivity indicators are factors that provide indications regarding the progress of crane operations at a worksite as a set of cranes follows a lift plan, and thus indicate a productivity value of the crane operations. For example, productivity indicators may be, but are not limited to being, any of the following: a time associated with crane operations; a weight lifted by the set of cranes; a lifecycle of the set of cranes; and a cost of crane operations. One embodiment compares these simulation measurements from the 3-D simulation to target measurements (those measurements desired to be achieved for crane operations). Based on the comparison of the simulation measurements with the target measurements, and according to an embodiment, a lift plan for crane operations may be adjusted.

For example, a lift plan designer of a lift plan for crane operations determines that the target time for the crane operations to be completed according to a lift plan is five hours. Embodiments provide a 3-D simulation of the lift plan created by the lift plan designer. The 3-D simulation of the lift plan shows that the designed lift plan actually takes five and one-half hours to complete. The lift plan designer and/or embodiments may then adjust the lift plan accordingly to enable the completion time to be reduced to that of the target time of five hours. Embodiments may then generate a 3-D simulation of the adjusted lift plan.

Thus, embodiments provide a method and system for adjusting a lift plan based upon a 3-D simulation of the lift plan, to achieve the most productive crane operations at a worksite.

General Description of Crane Operation

With reference now to FIG. 1A, an illustration of a side view of a tower crane 100 is presented, according to various embodiments. The tower crane 100 may also be referred to as a "horizontal crane".

The tower crane 100 includes a base 104, a mast 102 and a working arm (e.g., jib) 110. The mast 102 may be fixed to the base 104 or may be rotatable about base 104. The base 104 may be bolted to a concrete pad that supports the crane or may be mounted to a moveable platform. In one embodiment, the operator 132 is located in a cab 106 which includes a user interface 137.

The tower crane 100 also includes a trolley 114 which is moveable back and forth on the working arm 110 between the cab 106 and the end of the working arm 110. A cable 116 couples a hook 122 and hook block 120 to trolley 114. A counterweight 108 is on the opposite side of the working arm 110 as the trolley 114 to balance the weight of the crane components and the object being lifted, referred to hereinafter as the object 118.

With reference now to FIG. 1B, an illustration of a side view of the crane 160 is presented, according to various embodiments. The crane 160 may also be referred to as a luffer crane or a level luffing crane. The crane 160 may comprise some of the components described for the tower crane 100 of FIG. 1A.

The base 161 is a base or housing for components of the crane 160 such as motors, electrical components, hydraulics, etc. In one embodiment, the structure 162 comprises wheels, tracks, or other mechanics that allow for the mobility of the crane 160. In one embodiment, the structure 162 comprises outriggers that can extend or retract and are used for the stability of the crane 160. In one embodiment, the structure 162 is a platform for a stationary crane. It should be appreciated that the base 161 is able to rotate, swivel, or pivot relative to the structure 162 along the axis 167.

The pivot point 164 allows for the lattice boom 165 to pivot with respect to the base 161. In this manner, the lattice boom 165 can point in different directions and change the angle of the pivot point 166. The pivot point 166 allows for the jib 168 to pivot and change position with respect to the lattice boom 165 and the base 161.

It should also be appreciated that the present technology may be implemented with a variety of cranes including, but not limited to, a tower crane, a luffing crane, a level luffing crane, a fixed crane, a mobile crane, a self-erecting crane, a crawler crane, and a telescopic crane.

Figure 2:
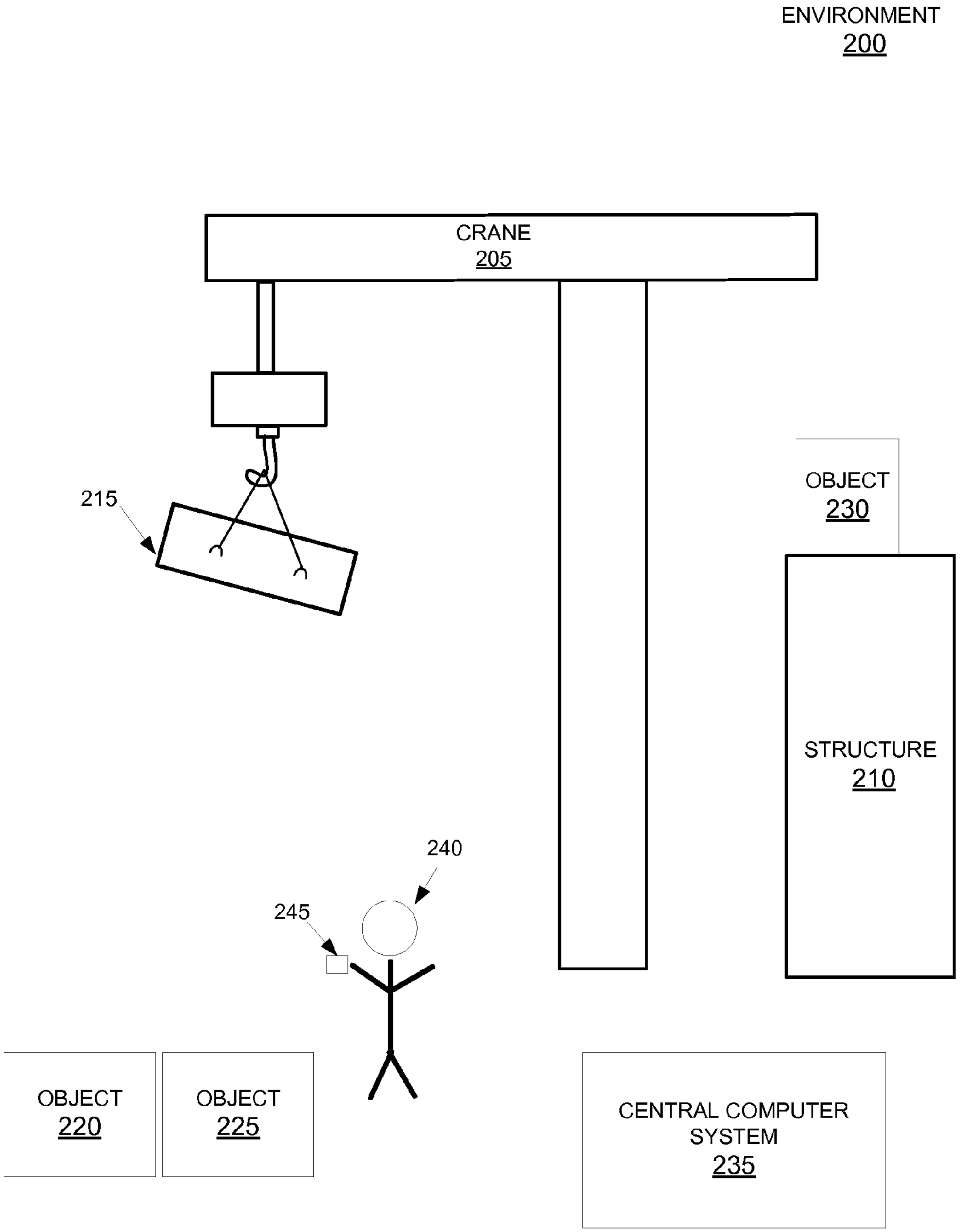
FIG. 2 is a block diagram of an environment with a crane, in accordance with an embodiment of the present technology.

With reference now to FIG. 2, an illustration of an environment 200, is shown in accordance with embodiments of the present technology. The environment 200 depicts a crane 205 which, in various embodiments, comprises the features and components of the cranes described in FIGS. 1A and 1B. The environment 200 may be a construction site, job site or other environment where large and heavy objects are lifted and moved by lifting devices such as the crane 205. The crane 205 is capable of moving objects such as objects 215, 220, 225, and 230, in at least the following directions: side-to-side, up and down, forward and backwards. The objects 215, 220, 225, and 230 may be building material or equipment used in the construction of the structure 210. The structure 210 may be a building such as a sky scraper, office tower, house, bridge, overpass, road, etc. The objects 220 and 225 are depicted as being in a staging area where they have been delivered to be used in the construction in environment. The object 215 is depicted as being lifted by the crane 205. The object 230 is depicted as being delivered by the crane 205 from the staging area to the structure 210. The object 230 may already be installed in the structure 210 or may be waiting to be installed in the structure 210. The objects 215, 220, 225, and 230 may be different types of building materials or may be the same type.

The environment 200 depicts a rigger 240. The rigger 240 is a person associated with the job site who typically works closely with the operator of the crane 205. However, the rigger 240 as depicted in the environment 200 may represent any person or user associated with the present technology. The rigger 240 may be responsible for ensuring that an object is properly loaded or rigged for loading onto the crane 205 for lifting. The rigger 240 is depicted as carrying a handheld device 245 which is an electronic device capable of sending electronic data to the central computer system 235. In one embodiment, the handheld device 245 is a mobile computer system, a smart phone, a tablet computer, or other mobile device. The handheld device 245 may have output means such as a display and/speakers and input means such as a keyboard, touchscreen, microphone, RFID reader, camera, bar code scanner, etc. The handheld device 245 may comprise a battery for power and may send data over a wireless connection such as Wifi, Near Field Communication (NFC), Bluetooth, cellular networks, etc. The handheld device 245 may be an off-the-shelf device that may have components added to it or may be a specific purpose device built for the present technology.

The handheld device 245 may also comprise communication components that allow the rigger 240 to communicate verbally or otherwise with the operator of the crane 205 as well as other personnel such as a job foreman. In one embodiment, the handheld device 245 displays a lift plan to rigger 240 that is a schedule of what objects are to be lifted by crane 205 and in what order. Thus, the rigger 240 knows what object is to be loaded or lifted next. For example, after the object 215 is lifted, then the lift plan may inform the rigger 240 that the object 220 is to be lifted next. The rigger 240 can then identify and prepare or rig the object 220 for lifting. The handheld device 245 may assist the rigger 240 in identifying the object 220 by the handheld device 245 scanning, detecting, or otherwise reading the identifier 221. After an object is identified, the identification data may be sent to the operator of the crane 205, the job foreman, the central computer system 235, and/or other places, such as the lift plan simulator 300 (See FIG. 3) of the present technology (discussed in detail below). In one embodiment, the lift plan simulator 300 is located at the central computer system 235. In another embodiment, the lift plan simulator 300 is located at the crane 302. In one embodiment, the lift plan simulator 300 is located external to, communicatively coupled with, the central computer system 235. In one embodiment, after the object is identified by the rigger 240, the handheld device 245 may give the rigger 240 the opportunity to modify, verify, update, supplement, or otherwise change the identification data. Other personal may also be given the opportunity to change the data such as the operator of the crane 205 or the job foreman. The identification data may also comprise the other data regarding the characteristics of the object. In one embodiment, the rigger 240 manually enters data regarding the identity or characteristics of the object into the handheld device 245 based on data that the rigger 240 reads from a label applied to the object or based on a visual identification on the part of the rigger. The sensors associated with handheld device 245 that identify an object may be referred to as identity sensors.

It should be appreciated that the central computer system 235 may be located at the environment 200 or located anywhere else in the world. The central computer system 235 may be more than one computer system and may have some components located in the environment 200 and others located elsewhere. In one embodiment, the central computer system 235 is a lift plan simulator 300. In one embodiment, the central computer system 235 is associated with the lift plan simulator 300 and is able to pull information from the lift plan simulator 300.

It should be appreciated that while FIGS. 1A, 1B, and 2 depict cranes, the present technology may also be practiced using other lifting devices such as forklifts. In accordance with the present technology, a forklift may also be used in conjunction with a rigger and a handheld device.

Example Lift Plan Simulator

Figure 3:
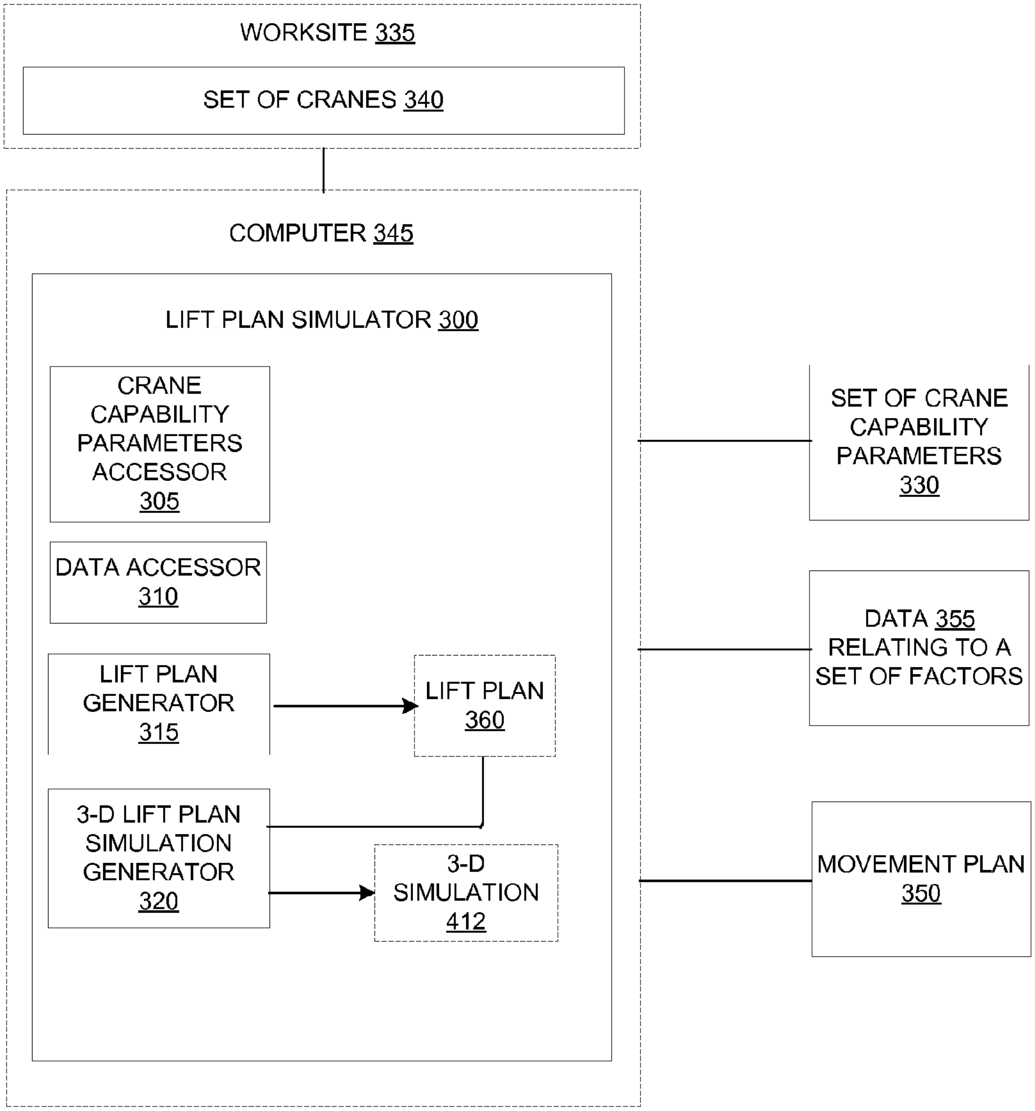
FIG. 3 is a block diagram of a lift plan simulator, in accordance with an embodiment of the present technology.
Figure 4:
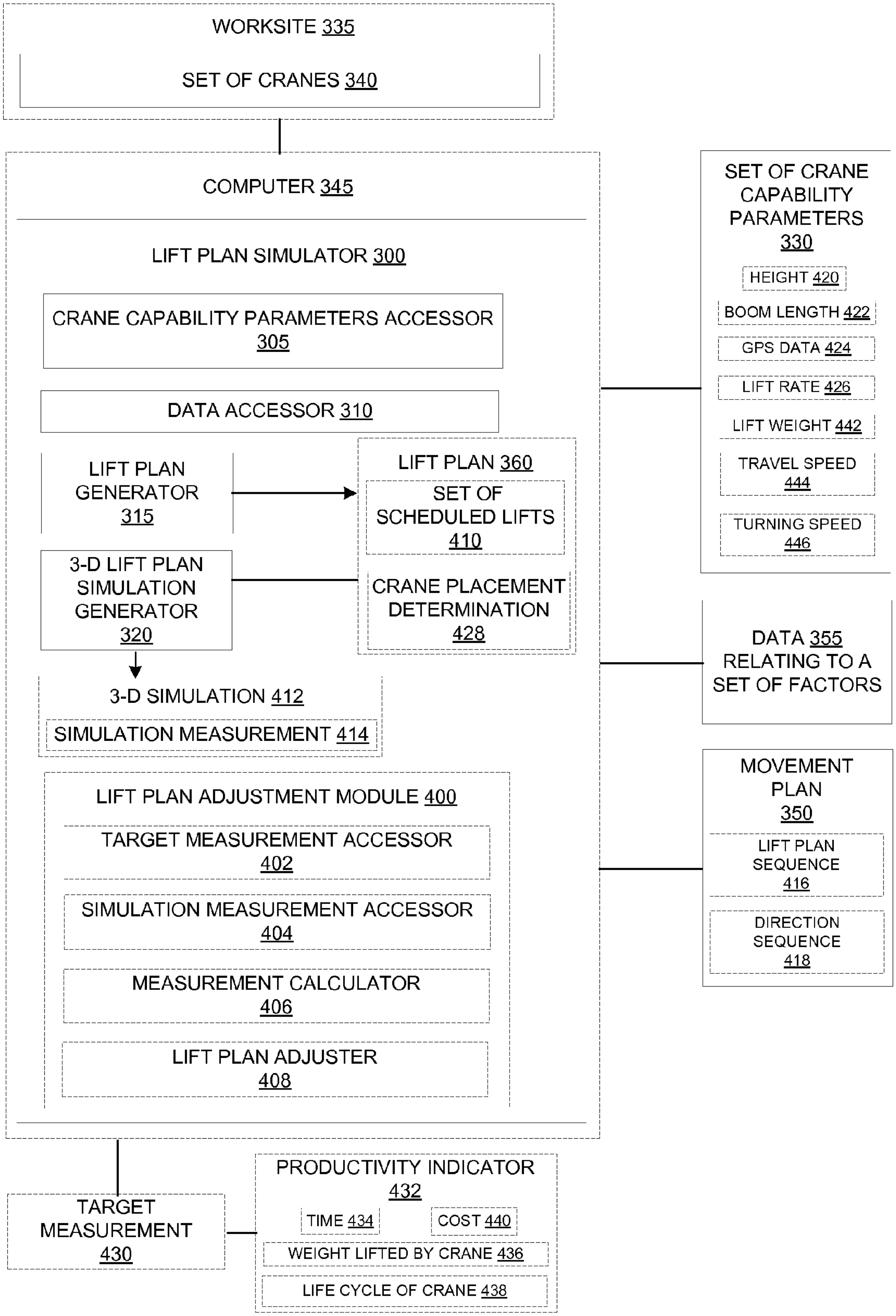
FIG. 4 is a block diagram of a lift plan simulator, in accordance with an embodiment of the present technology.

FIGS. 3 and 4 show block diagrams of an example lift plan simulator 300, in accordance with an embodiment. The lift plan simulator 300 includes the following components coupled with a computer 330 (See example computer 600 of FIG. 6—computer 330 includes similar features as computer 600): a crane capability parameter accessor 305; a data accessor 310; a movement plan applicator 315; a lift plan generator 320; and a 3-D lift plan simulation generator 325.

In one embodiment, the computer 345 is coupled with the central computer system 235. In another embodiment, the computer 345 is communicatively coupled with the central computer system 235. In yet another embodiment, the computer 345 is the central computer system 235.

In various optional embodiments, the lift plan simulator 300 includes a lift plan adjustment module 400. The lift plan adjustment module 400 includes the following: a target measurement accessor 402; a simulation measurement accessor 404; a measurement calculator 406; and a lift plan adjuster 408.

In one embodiment, the lift plan simulator 300 is located at the set of cranes 340. In another embodiment, the lift plan simulator 300 is located external to but is communicatively coupled with (via wire and/or wirelessly) the set of cranes 340. In one embodiment, the lift plan simulator 300 is communicatively coupled with, via wire and/or wirelessly, the computer 345. In one embodiment, the computer 345 is located at the set of cranes 340. In another embodiment, the computer 345 is located external to and is communicatively coupled with (via wire and/or wirelessly) the set of cranes 340.

In various embodiments, the computer 345 includes any of the following: the set of crane capability parameters 330; the data 355 relating to a set of factors; and the movement plan 350. In one embodiment, the following information resides at the same computer or at a set of computers, separate from, but communicatively coupled with (via wire and/or wirelessly), the computer 345: the set of crane capability parameters 330; the data 355 relating to a set of factors; and the movement plan 350.

The crane capability parameters accessor 305 accesses a set of crane capability parameters for the set of cranes 340 at the worksite 335. The set of cranes 340 may be one or more cranes to which the lift plan simulator 300, in one embodiment, is coupled, or may be one or more cranes that are capable of providing crane operations at the worksite 335. Crane capability parameters describe specification information about cranes, such as, but not limited to, the following: a crane's height 420; a crane's boom length 422; GPS data 424 that a crane is able to generate; a crane's lift rate 426; a weight 442 that a crane is able to lift; a crane's travel speed 444; and a crane's turning speed 446. In one embodiment, the weight lifted is the weight lifted each time a crane makes a lift. In another embodiment, the weight lifted is the total weight lifted for the total amount of lifts a crane performs.

The movement plan applicator 310 accesses data 355 relating to a set of factors, if any, occurring external to the set of cranes 340, wherein the set of factors affects an operation of the set of cranes 340 at the worksite 335. The set of factors that may affect an operation of the set of cranes 340 includes any, but is not limited to, the following: wind speed; and a competence value associated with a crane operator. For example, during crane operations, the wind speed may provide cause the working arm 110 to become slightly unstable, thereby causing the crane operator to slow the lift and travel rate of the working arm in order to control the working arm 110 that is wavering slightly from the wind, and hence slowing the crane operations. In another example, an inexperienced crane operator generally will have more difficulties controlling the crane, and hence the performance of the crane operations will be slower than the performance of crane operations by an experienced crane operator. Thus, in generating a 3-D simulation of the lift plan, embodiments consider factors that occur external to the set of cranes 340, yet still affect crane operations.

The lift plan generator 320 generates a lift plan 360 for the set of objects at the worksite 335, based on the accessed set of crane capability parameters 330, the accessed data 355 and a movement plan 350. It should be appreciated that the set of objects refers to one or more objects. An object is a thing at a worksite that is capable of being lifted. Typically, the object will be an item relating to construction, such as wood, metal, bars, concrete blocks, etc. The movement plan 350 is input to the computer 345 or to a computer communicatively coupled with the computer 345 and/or the lift plan simulator 300. In one embodiment, the movement plan 350 is input, directly or indirectly, by a person (e.g., crane operator, rigger, operator directing the set of cranes 340 remotely, etc.), while in another embodiment, the movement plan 350 is computer-generated based on known data, such as the location of the objects, the location at which the objects are to be moved, the dimensions of the objects, etc.

In one embodiment, the movement plan 350 includes a lift plan sequence 416 and/or direction sequence 418. For example, a sequence of lifts for each of the objects of the set of objects is ordered sequentially. For instance, the lift plan sequence 416 for a concrete block, a stack of roofing materials, and bundles of metal rebar may provide directions indicating the following: move the stack of roofing materials first to Point "A"; move the bundles of metal rebar second to Point "B"; and move the concrete block third to Point "C". It should be appreciated that the directions provided by the lift plan sequence 416 of the movement plan 350 may be in any communication that the receiver of the directions can understand. For example, the directions may be described in text such that a crane operator can understand and/or the directions may be described in computer code such that the lift plan simulator 300 and/or the computer 345 is able to understand.

In another embodiment, the direction sequence 418 of the movement plan 350 refers to a direction and orientation for which the set of objects are to be moved.

In one embodiment, the lift plan 360 includes a set of scheduled lifts 410. The set of scheduled lifts 410 describes any of, but is not limited to, the following information with regard to crane operations: the sequence of lifts, the destination of the lifts, the routing information to arrive at the destination, the crane(s) to perform the lifts; and the number of lifts to take place over a period of time. In another embodiment, the lift plan 360 includes a crane placement determination 428. For example, the lift plan 360 determines the best location at which a particular crane should be located, in order to perform according to the lift plan 360.

The 3-D lift plan simulation generator 325 generates a 3-D simulation 412 of the lift plan 360. In one embodiment, the 3-D simulation 412 may simulate the lift plan 360 for a first type of crane, such as a tower crane. In another embodiment, the 3-D simulation 412 may simulate the lift plan 360 for second type of crane, such as a crawler crane. Thus, a plurality of 3-D simulations may be performed using different types of cranes. In another embodiment, different 3-D simulations may be performed, using the same type of crane. In yet another embodiment, different 3-D simulations may be performed, using the same type of crane, but with different lengths of the boom.

In various embodiments, the 3-D simulation 412 is displayed from various viewpoints. For example, in one embodiment, the 3-D simulation 412 is displayed as a top view looking down on the worksite. In another embodiment, the 3-D simulation 412 is displayed from a bird's eye view. In yet another embodiment, the 3-D simulation 412 is displayed from the point of view of the crane operator.

The target measurement accessor 402 accesses a target measurement 430 relating to a productivity indicator for the operation of the crane 340 at the worksite 335. The target measurement 430 is that value that is assigned to the productivity indicator 432 which is desired to be achieved via the lift plan 360. In one example, the target measurement 430 is a time measurement of thirty hours for a lift plan to be completed (how long a given lift or a sequence of lifts takes to complete). Thus, for example, the managers and/or lift plan designers may determine that the target measurement 430 is thirty hours. In other words, the lifting according to a lift plan is desired to take a total of thirty hours to complete. In various optional embodiments, the productivity indicator may be, but is not limited to being, any of the following: time 434, weight 436 lifted by the crane 340; lift cycle 438 of the crane 340; and cost 440 associated with crane operations of the crane 340.

The simulation measurement accessor 404 accesses a simulation measurement from the 3-D simulation 412 of the lift plan 360. For example, the simulation measurement 414 of the time that it took for the 3-D simulation 412 of the lift plan 360 to be completed is accessed from the data relating to the 3-D simulation 412. The data relating to the 3-D simulation 412, in one example, shows that the 3-D simulation 412 of the lift plan 360 actually took a total of thirty-two hours to complete.

The measurement calculator 406 determines a difference between the target measurement 430 and the 3-D simulation measurement 414. Continuing with the example above, the difference between the target measurement 430 of thirty hours and the simulation measurement 414 of thirty-two hours is a two hours.

The lift plan adjuster 408 adjusts the lift plan 360 based on the difference determined by the measurement calculator 406.

As noted, the lift plan simulator 300 may be located at the computer 345. The computer, in various embodiments, is located at the set of cranes 340 or external to the set of cranes 340. In one embodiment, the computer 345 is located external to the crane and is communicatively coupled with the set of cranes 340.

Thus, it should be appreciated that the method and system for simulating a lift plan, in various embodiments, is implemented through what may be a network of computers located at the set of cranes 340 and/or external to the set of cranes 340.

Example Method for Simulating a Lift Plan

Figure 5:
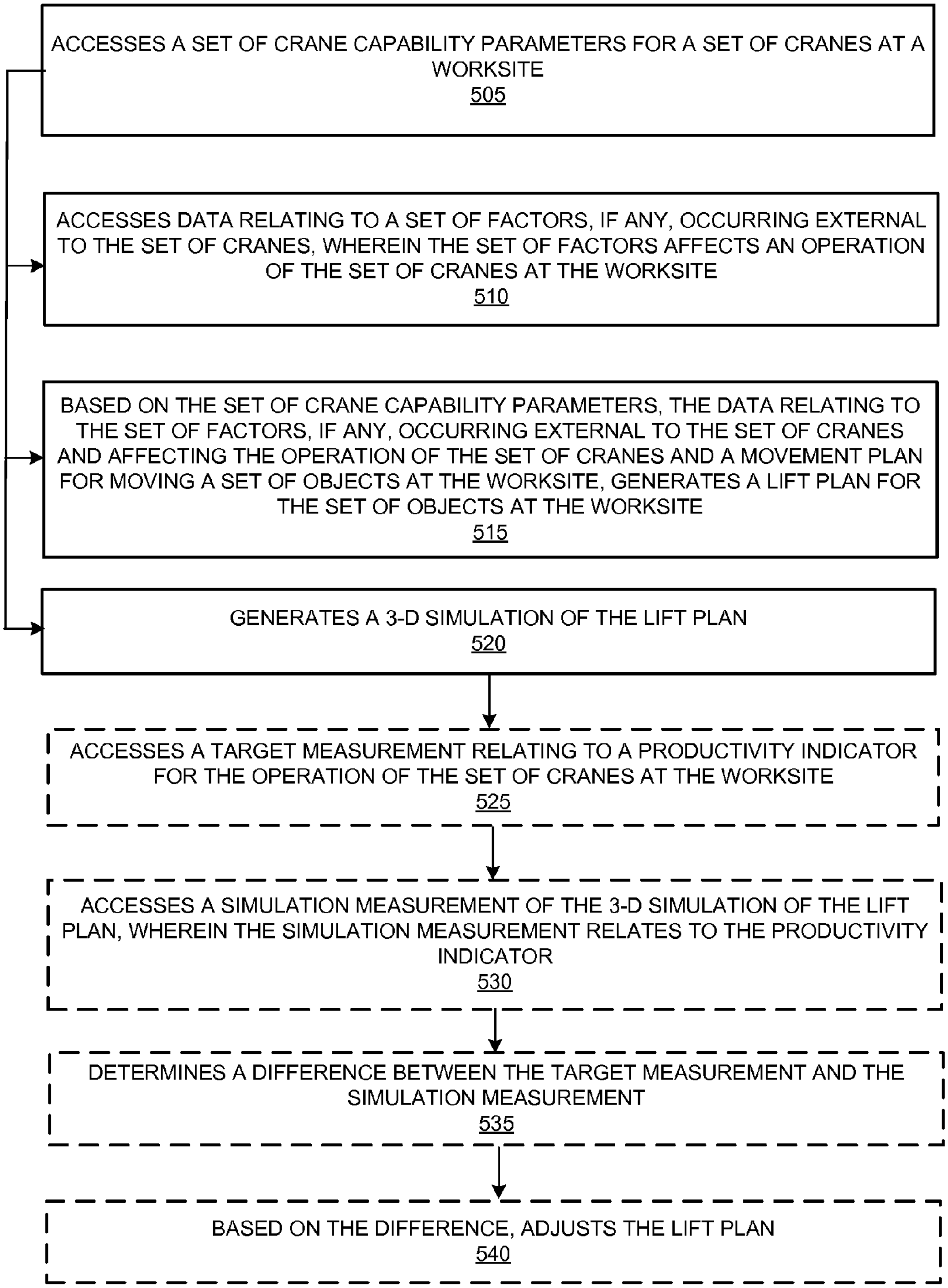
FIG. 5 is a flowchart of a method for simulating a lift plan, in accordance with an embodiment of the present technology.

With reference to FIG. 5, the process 500 is a process for simulating a lift plan, according to an embodiment. In one embodiment, the process 500 is a computer implemented method that is carried out by processors and electrical components under the control of computer readable and computer executable instructions. The computer readable and computer executable instructions reside, for example, in data storage features such as computer readable volatile and non-volatile memory. However, the computer readable and computer executable instructions may reside in any type of non-transitory computer readable storage medium. In one embodiment, the process 500 is performed by components of FIGS. 1A, 1B, 2, 3 and 4. In one embodiment, the methods may reside in a computer readable storage medium having instructions embodied therein that when executed cause a computer system to perform the method.

At step 505, in one embodiment and as described herein, a set of crane capability parameters 330 for the set of cranes 340 at the worksite 335 is accessed. The term "accessed" refers to either retrieving the set of crane capability parameters 330 or receiving the set of crane capability parameters 330.

At step 510, in one embodiment and as described herein, the data 355 relating to a set of factors, if any, occurring external to the crane 340 is accessed, wherein the set of factors affects an operation of the set of cranes 340 at the worksite 335. The term "accessed" refers to either retrieving by the data 355 relating to the set of factors or receiving the data 355 relating to the set of factors.

At step 515, based on the set of crane capability parameters 330, the data 355 relating to a set of factors, if any, occurring external to the set of cranes 340 and the movement plan 350, a lift plan 360 for the set of objects at the worksite 335 is generated.

At step 520, in one embodiment and as described herein, a 3-D simulation of the lift plan 360 is generated.

At step 525, in one embodiment and as described herein, the target measurement 430 relating to the productivity indicator 432 for the operation of the set of cranes 340 at the worksite 335 is accessed.

At step 530, in one embodiment and as described herein, a simulation measurement 414 of the 3-D simulation 412 of the lift plan 360 is accessed, wherein the simulation measurement 414 relates to the productivity indicator 432.

At step 535, in one embodiment and as described herein, a difference between the target measurement 430 and the 3-D simulation measurement 414 is determined.

At step 540, in one embodiment and as described herein, based on the difference determined at step 535, the lift plan 360 is adjusted.

Computer System

Figure 6:
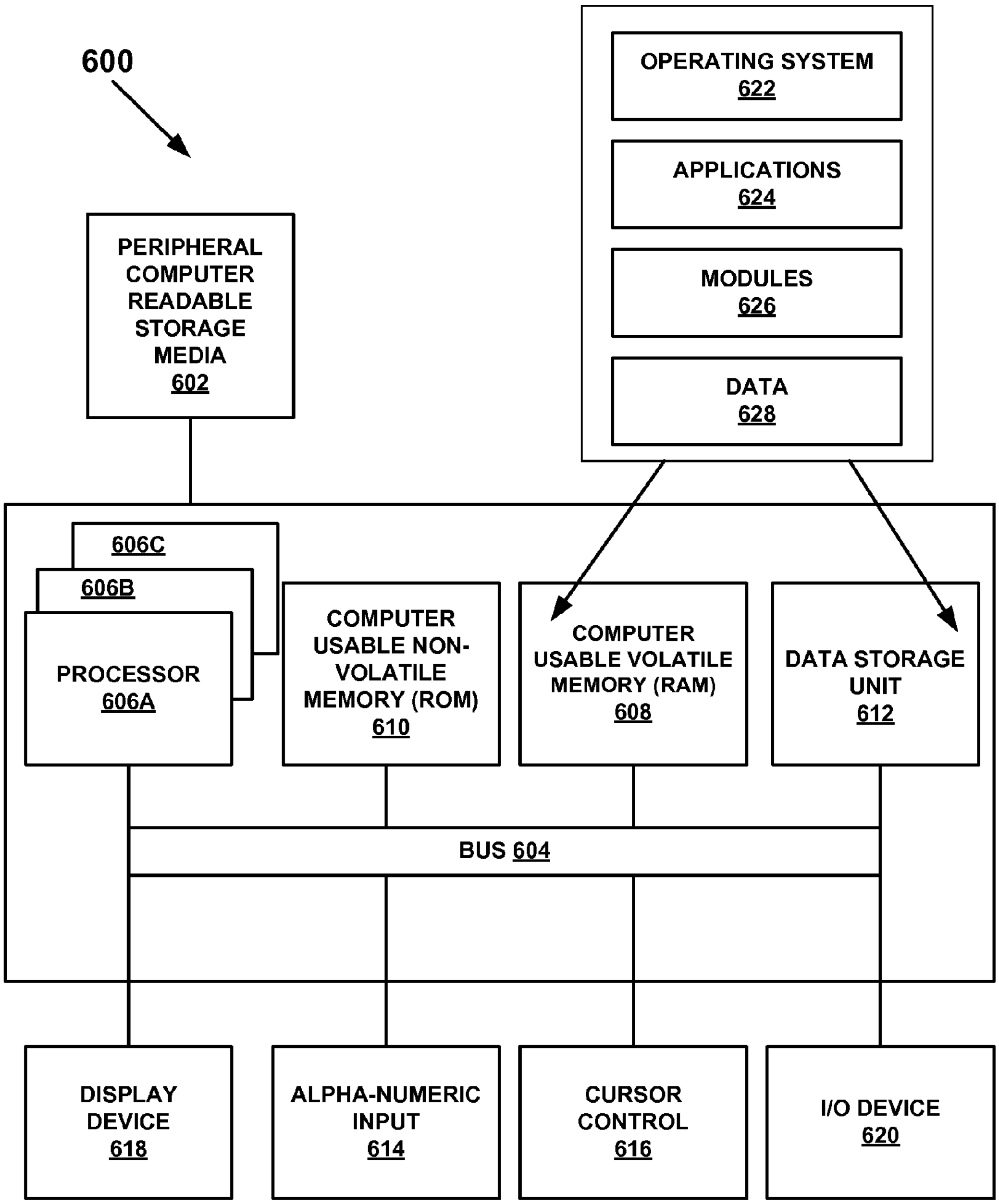
FIG. 6 is a block diagram of an example computer system upon which embodiments of the present technology may be implemented.

With reference now to FIG. 6, portions of the technology for providing a communication composed of computer readable and computer-executable instructions that reside, for example, in non-transitory computer readable storage media of a computer system. That is, FIG. 6 illustrates one example of a type of computer that can be used to implement embodiments of the present technology, such as the handheld device 245, central computer system 235 of FIG. 2 and the lift plan simulator 300 of FIGS. 3 and 4. FIG. 6 represents a system or components that may be used in conjunction with aspects of the present technology. In one embodiment, some or all of the components of FIGS. 1A, 1B, 2, 3 and 4 may be combined with some or all of the components of FIG. 6 to practice the present technology.

FIG. 6 illustrates an example computer system 600 used in accordance with embodiments of the present technology. It is appreciated that system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a floppy disk, a compact disc, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g. random access memory (RAM), coupled to bus 604 for storing information and instructions for processors 606A, 606B, and 606C.

System 600 also includes computer usable non-volatile memory 610, e.g. read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alpha-numeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. System 600 of the present embodiment also includes an optional display device 618 coupled to bus 604 for displaying information.

Referring still to FIG. 6, optional display device 618 of FIG. 6 may be a liquid crystal device, cathode ray tube, plasma display device, light emitting diode (LED) light-bar, or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick or special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet. A more detailed discussion of the present technology is found below.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the internet. In one embodiment, the present technology, for example, is stored as an application 624 or module 626 in memory locations within RAM 608 and memory areas within data storage unit 612. The present technology may be applied to one or more elements of described system 600.

System 600 also includes one or more signal generating and receiving device(s) 630 coupled with bus 604 for enabling system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from system 600. Communication interface 632 may include a serial port, parallel port, Universal Serial Bus (USB), Ethernet port, antenna, or other input/output interface. Communication interface 632 may physically, electrically, optically, or wirelessly (e.g. via radio frequency) couple system 600 with another device, such as a cellular telephone, radio, or computer system.

The computing system 600 is only one example of a suitable computing environment and is not intended to suggest any limitation as to the scope of use or functionality of the present technology. Neither should the computing environment be interpreted as having any dependency or requirement relating to any one or combination of components illustrated in the example computing system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What we claim is:

1. A non-transitory computer readable storage medium having instructions embodied therein that when executed cause a computer system to perform a method for simulating a lift plan, said method comprising:

accessing a set of crane capability parameters for a set of cranes at a worksite;

accessing data relating to a set of factors, if any, occurring external to said set of cranes, wherein said set of factors affects an operation of said set of cranes at said worksite;

based on said set of crane capability parameters, said data relating to said set of factors, if any, occurring external to said set of cranes and affecting said operation of said set of cranes and a movement plan for moving a set of objects at said worksite, generating a lift plan for said set of objects at said worksite; and generating a 3-D simulation of said lift plan.

2. The non-transitory computer readable storage medium as recited in claim 1, further comprising:

accessing a target measurement relating to a productivity indicator for said operation of said set of cranes at said worksite;

accessing a simulation measurement of said 3-D simulation of said lift plan, wherein said simulation measurement relates to said productivity indicator;

determining a difference between said target measurement and said simulation measurement; and based on said difference, adjusting said lift plan.

3. A lift plan simulator for providing a 3-D simulation of a lift plan for an operation of a set of cranes at a worksite, said lift plan simulator comprising:

a crane capability parameter accessor configured for accessing a set of crane capability parameters for said set of cranes;

a data accessor configured for accessing data relating to a set of factors, if any, occurring external to said set of cranes, wherein said set of factors affects an operation of said set of cranes at said worksite;

a lift plan generator configured for, based on said set of crane capability parameters, said data relating to said set of factors, if any, occurring external to said set of cranes and affecting said operation of said set of cranes and a movement plan for a set of objects, generating a lift plan for said set of objects at said worksite; and a 3-D lift plan simulation generator configured for generating a 3-D simulation of said lift plan.

4. The lift plan simulator of claim 3, wherein said set of crane capability parameters comprises:

height of each crane of said set of cranes.

5. The lift plan simulator of claim 3, wherein said set of crane capability parameters comprises:

boom length of each crane of said set of cranes.

6. The lift plan simulator of claim 3, wherein said set of crane capability parameters comprises:

GPS data able to be generated by each crane of said set of cranes.

7. The lift plan simulator of claim 3, wherein said set of crane capability parameters comprises:

lift rate of each crane of said set of cranes.

8. The lift plan simulator of claim 3, wherein said movement plan comprises:

a direction sequence.

9. The lift plan simulator of claim 3, wherein said movement plan comprises:

a lift plan sequence.

10. The lift plan simulator of claim 3, wherein said lift plan comprises:

a set of scheduled lifts.

11. The lift plan simulator of claim 3, wherein said lift plan comprises:

a crane placement determination.

12. The lift plan simulator of claim 3, wherein said 3-D simulation of said lift plan comprises:

a view from a top of a crane of said set of cranes looking down.

13. The lift plan simulator of claim 3, wherein said 3-D simulation of said lift plan comprises:

a bird's eye view.

14. The lift plan simulator of claim 3, wherein said 3-D simulation of said lift plan comprises:

a point of view of a crane operator.

15. The lift plan simulator of claim 3, further comprising:

a lift plan adjustment module configured for adjusting said lift plan, said lift plan adjustment module comprising:

a target measurement accessor configured for accessing a target measurement relating to a productivity indicator for said operation of said set of cranes at said worksite;

a simulation measurement accessor configured for accessing a simulation measurement of said 3-D simulation of said lift plan, wherein said simulation measurement relates to said productivity indicator;

a measurement calculator configured for determining a difference between said target measurement and said simulation measurement; and a lift plan adjuster configured for, based on said difference, adjusting said lift plan.

16. The lift plan simulator of claim 15, wherein said productivity indicator comprises:

a time.

17. The lift plan simulator of claim 15, wherein said productivity indicator comprises:

a weight lifted by each crane of said set of cranes.

18. The lift plan simulator of claim 15, wherein said productivity indicator comprises:

a lift cycle by each crane of said set of cranes.

19. The lift plan simulator of claim 15, wherein said productivity indicator comprises:

a cost associated with crane operations of each crane of said set of cranes.

* * * * *